Jan. 6, 1942.  C. ELLIS, JR., ET AL  2,268,861
PROCESS AND APPARATUS FOR PREHEATING
Filed March 30, 1939  3 Sheets-Sheet 2
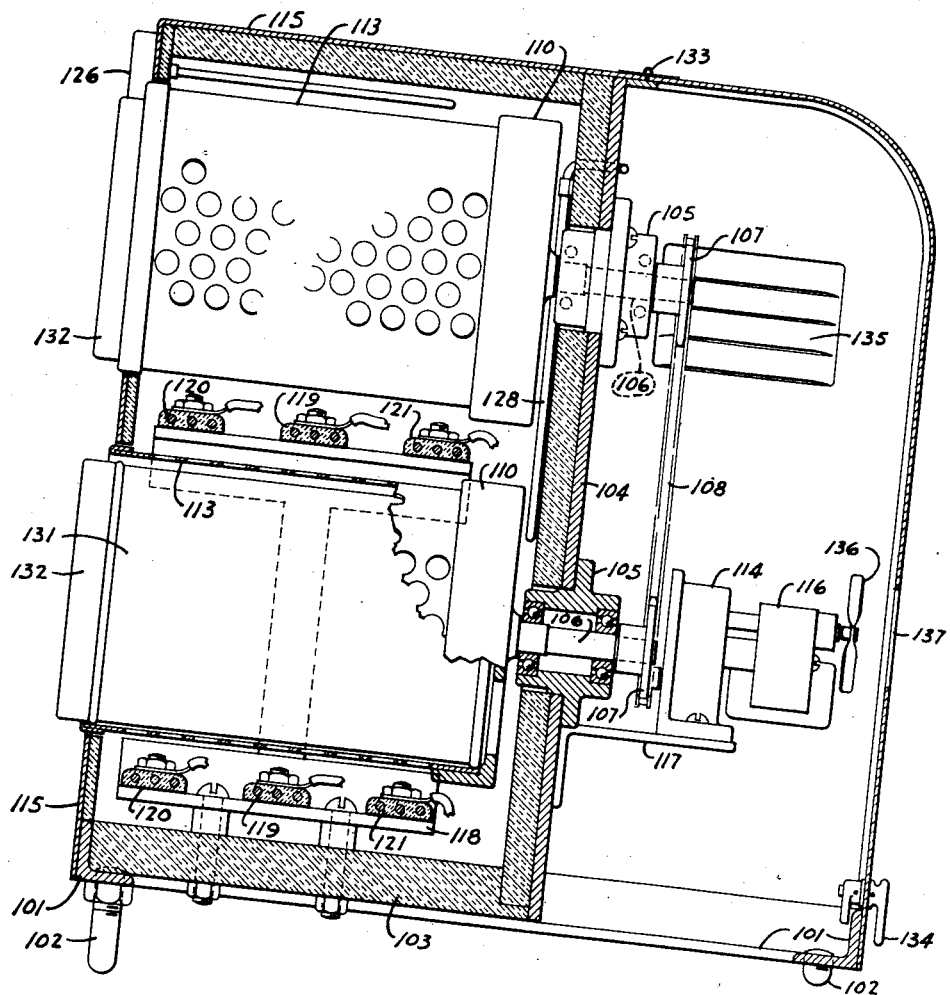
Fig. V
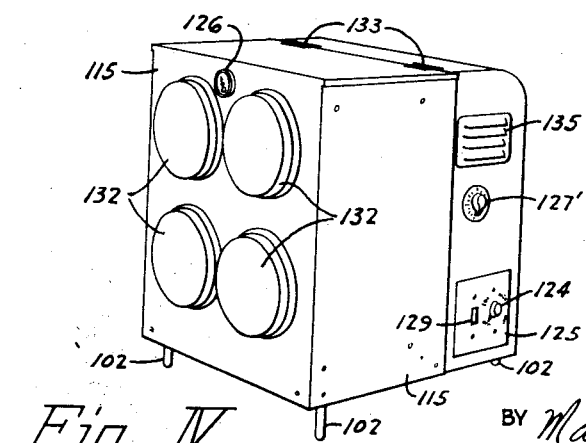
Fig. IV
Carleton Ellis, Jr.
Charles S. Dewey, Jr.
INVENTORS
BY Marshall and Marshall
ATTORNEYS Jan. 6, 1942.　　　C. ELLIS, JR., ET AL　　　2,268,861
PROCESS AND APPARATUS FOR PREHEATING
Filed March 30, 1939　　　3 Sheets—Sheet 3
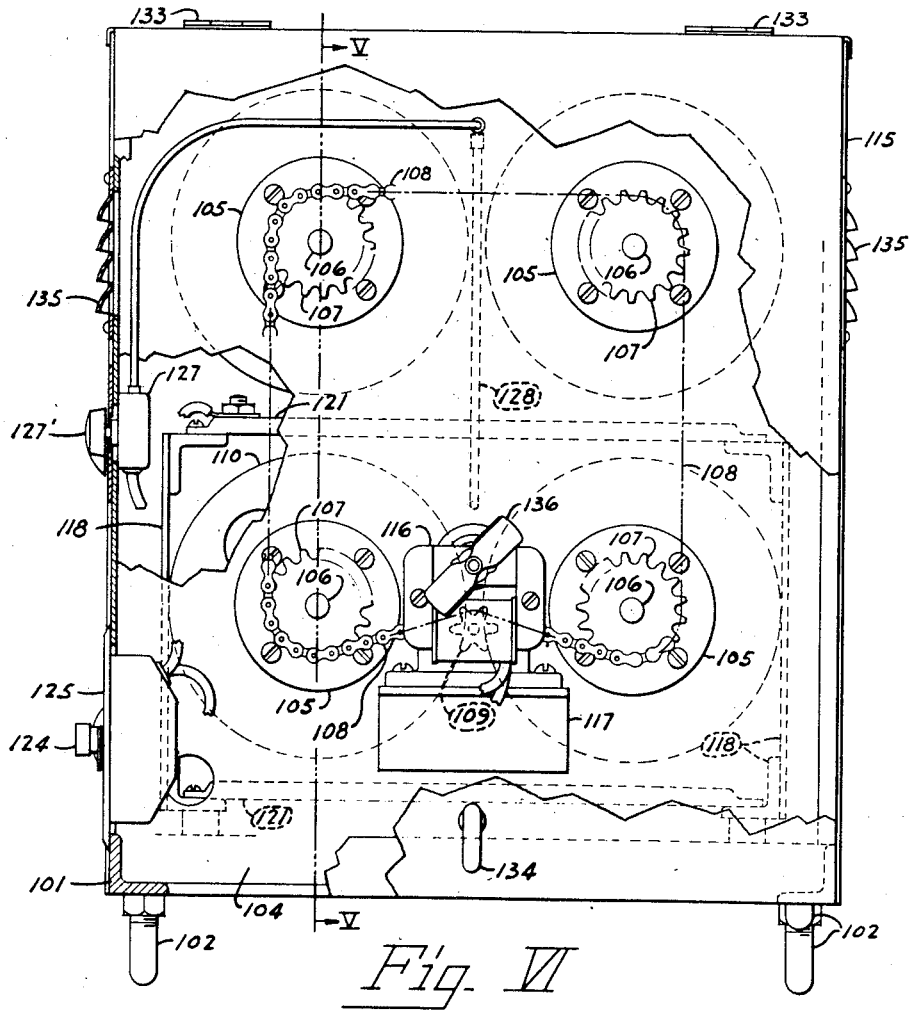
Fig. VI
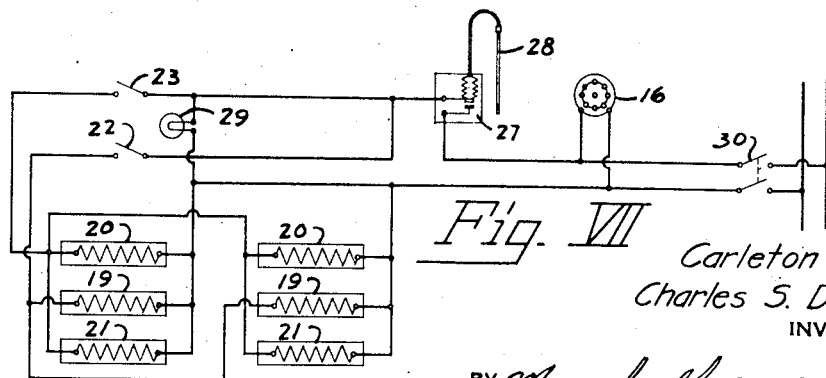
Fig. VII
Carleton Ellis, Jr.
Charles S. Dewey, Jr.
INVENTORS
BY Marshall and Marshall
ATTORNEYS Patented Jan. 6, 1942

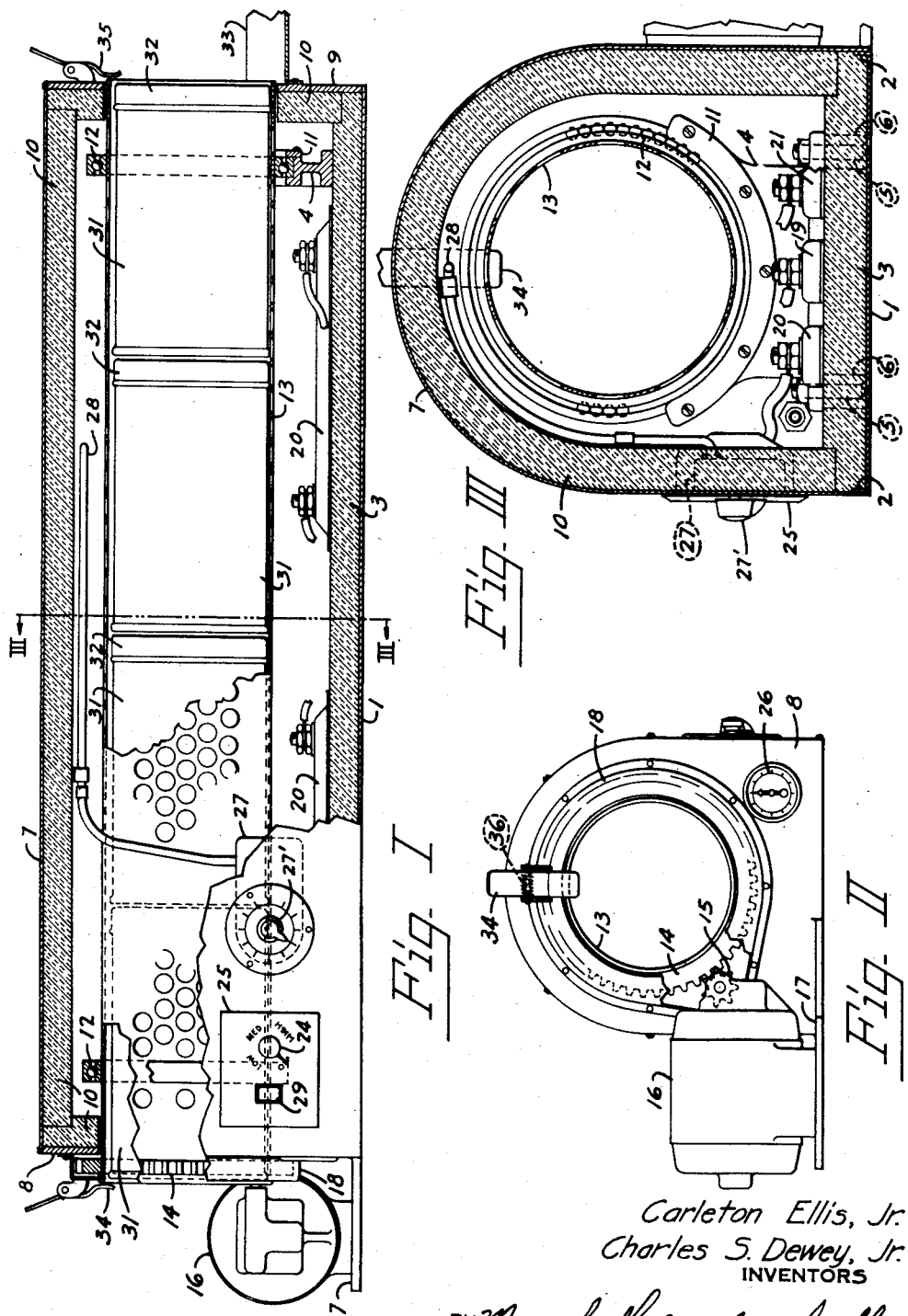

2,268,861

UNITED STATES PATENT OFFICE 2,268,861

PROCESS AND APPARATUS FOR PREHEATING

Carleton Ellis, Jr., Toledo, Ohio, and Charles S. Dewey, Jr., Chicago, Ill.

Application March 30, 1939, Serial No. 264,952

13 Claims. (Cl. 219—19)

This invention relates to a process and apparatus for preheating molding materials.

Thermosetting molding materials usually are prepared in comminuted or tableted form. Weighed or measured charges of the powdered or granulated material, or tablets or pellets made therefrom, are placed in molds and subjected to heat and pressure. Under the influence of heat the material softens sufficiently to be pressed into the shape of the mold, and then permanently hardens.

Thermoplastic materials also usually are prepared in fragmentary or tableted form. The granular material or tablets may either be placed in molds and there subjected to heat and pressure, or may be fed into heated chambers and forced therefrom into molds where the thermoplastic material is hardened by cooling.

The thermal conductivity characteristics of all thermosetting and thermoplastic molding materials are very poor and their specific heats are low. Most of them decompose or "burn" at temperatures not greatly higher than the optimum temperatures for molding. If the material in close contact with the walls of the heated mold or the injection chamber walls gets too hot, the product will have surface discoloration or other defects. If the interior of the mass does not become hot enough, the material does not flow properly and the product will lack homogeneity and coalescence and be structurally weak, and may exhibit flow lines and other flaws.

The application of heat to molding material drives off occluded and adsorbed air and gases, which will form blisters unless the mold or pressure chamber is opened or "breathed" to release the air or gases and the pressure again applied during hardening of the molded piece.

The above mentioned difficulties may be minimized by preheating molding material uniformly throughout its mass and then charging the preheated material into the mold or pressure chamber. By preheating, the time that the material must remain in the molding apparatus is greatly reduced, and because of the fact that less pressure is required to shape the uniformly heated material, the number of mold cavities may be increased, or larger moldings may be made without increase of total pressures. Thus proper preheating increases the productivity of expensive presses and at the same time improves the quality of the products.

The time during which molding material is subjected to preheating, as well as the preheating temperatures, must, however, be carefully controlled, superheating of fragments or surfaces must be avoided, and the material must be molded promptly after preheating or premature hardening may occur.

It is an object of this invention to provide means for effectively preheating weighed or measured charges of molding material uniformly throughout and making them available at proper intervals and in condition for convenient handling and prompt placement in molding apparatus.

Another object of the invention is to provide means capable of properly preheating charges of various quantities throughout a wide range.

Another object is the provision of preheating apparatus capable of being adjusted to deliver properly preheated charges of materials at intervals corresponding to a wide range of molding cycles.

Another object is to provide means by which liability of spoilage by dirt during transfer of molding material to or from a preheater is eliminated.

Another object is the provision of preheating means capable of successively processing materials of various types and colors without hazard of intercontamination.

Another object is to provide a preheating device having receptacles in which material is tumbled along all interior surfaces, whereby particles are prevented from clinging to such surfaces and overheating.

Another object is to provide means for slowly preheating charges of molding materials in closed containers which are made available at intervals co-ordinated with molding cycles.

And still another object is to provide preheating means having the above characteristics and which can be constructed at cost and sold at prices which render its installation and use highly economical in small as well as large molding establishments.

Other objects and advantages will be apparent from the following description, in which reference is had to the accompanying drawings illustrating preferred embodiments of the invention and wherein Fig. I is a side elevational view, with parts broken away and parts shown in section, of one form of preheating apparatus embodying the invention; Fig. II is a front elevational view thereof, a part of the casing being broken away; Fig. III is a somewhat enlarged sectional view taken as indicated by the line III—III on Fig. I; Fig. IV is a view in perspective of another form of preheating device embodying the invention;

Fig. V is an enlarged side elevational view of the device illustrated in Fig. IV, parts being broken away and parts shown in section along the line V—V of Fig. VI; Fig. VI is an enlarged rear elevational view of the device illustrated in Fig. IV, parts being broken away and parts shown in section; and Fig. VII is a wiring diagram of circuits and electrical apparatus employed in both of the illustrated forms of the invention.

*Description of the embodiment illustrated by Figs. I, II and III*

In the form of device illustrated by Figs. I, II and III, the base 1 is constructed of sheet metal, with upright flanges 2 along its sides. Overlying the base 1 is a slab 3 of insulation upon which stand a pair of ball race supporting brackets 4. Bolts 5, surrounded by spacing sleeves 6, serve to secure the brackets 4 to the base 1 and also to hold the slab 3 in place.

Secured, preferably by welding, to the upright flanges 2 is a sheet metal cover 7, illustrated as having vertical sides and an arching top, a front plate 8 and a rear plate 9 of heavier metal being inserted in the ends of the cover 7 and suitably secured to the cover and to the base 1. The cover 7 and the end plates 8 and 9 are lined with insulation 10.

The ball race supporting brackets 4 have arcuate upper sides and are provided with arcuate clamping bars 11, by means of which the outer races of ball bearings 12 are fixed to the brackets. The inner races of the ball bearings 12 surround and are soldered or otherwise fastened to a perforated sheet metal cylinder 13, the ends of which project through openings in the end plates 8 and 9 and in the insulation with which the end plates are lined, the clearance between the cylinder and the openings being just sufficient to permit free rotation of the cylinder. The perforated sheet metal cylinder 13 is open at both ends and its front end carries and is encircled by a ring gear 14 which meshes with a pinion 15 mounted to be turned slowly, e. g. 34 R. P. M., through speed reduction gearing (not shown) by an electric motor 16. The motor 16 is mounted upon a foot 17, which may be integral with the front end plate 8. The ring gear 14 and the pinion 15 are enclosed in an annular sheet metal housing 18.

Mounted above the insulating slab 3 and underlying the cylinder 13 are three pairs of electric heating units 19, 20 and 21. As will be apparent by inspection of the wiring diagram (Fig. VII), the heating units 19 may be energized by closing a switch 22, while the heating units 20 and 21 may be energized by closing a switch 23. For convenient operation, both switches 22 and 23 are operated by a single knob 24 mounted upon a switchboard 25 which is marked "Off," "Low," "Med.," and "High." The knob 24 carries a pointer which points to "Off" when both switches 22 and 23 are open, to "Low" when only the switch 22 is closed, to "Med." when only the switch 23 is closed, and to "High" when both switches 22 and 23 are closed. Hence, by turning the knob 24 so that the pointer indicates "Low," the operator may cause two heating units to be energized, by turning it further to indicate "Med." he may cause four to be energized, and by turning it to "High" he may close both switches to energize all six of the units.

The temperature inside the cover 7 and its lining of insulation is indicated visibly by a thermometer having an exterior dial 26 which may be mounted on the front end plate 8, but automatic temperature control is effected by means of a thermostat-operated switch 27, which may be set by means of an adjusting knob 27' to open and close at various temperatures, as will be evident from the wiring diagram (Fig. VII). The heat sensitive element 28 of the thermostat preferably lies above the cylinder 13, while the adjusting knob 27' is preferably located adjacent the switch operating knob 24.

In order that the user may know how continuously the heating units are being energized, a pilot lamp 29 is connected in series with the thermostat-operated switch 27 and is mounted to be visible at the switchboard 25. The pilot lamp 29 is lighted whenever any of the heating units are energized.

The motor 16 is connected in parallel with the above described heating system between the thermostat-operated switch and a line switch 30, so that the cylinder 13 is rotated continuously while the line switch is closed, whether the heating units are energized or not.

The motor with its speed reduction gearing, the heating units, the thermometer, the thermostat and the switches may all be well-known commercial types. For this reason their details of construction are not illustrated and described in this specification. Strip heating units having a maximum sheath temperature of 750° F. have been found to work well in preheaters constructed according to this invention and having cylinders 5⅝" in diameter and 36" in length turning at 34 R. P. M. Two such heating units continuously energized will raise the temperature of the air inside the cover 7 above 200° F. even while heat is being absorbed by material under treatment, four heating units continuously energized will raise the temperature of the air above 300° F., and six units will raise it beyond 400° F.

The open-ended revoluble perforated sheet metal cylinder 13 is adapted to receive a plurality of containers 31, which preferably are inexpensive cans, such as standard 5½" x 9" drug cans with tightly fitting slip covers 32, each of which is adapted to contain a weighed or measured charge of powdered, granular, or tableted molding material. The containers are slidable longitudinally within the cylinder. When a container of unheated molding material is pushed into one end of the full cylinder, a container of preheated material is discharged from the other end, where it may be received in a cradle 33.

In order to prevent the containers from creeping along the cylinder as it rotates, pivoted guards 34 and 35 may be mounted, respectively, on the housing 18 and the end plate 9 to overhang the open ends of the cylinder, the guards being yieldably held in such overhanging positions by springs 36. When a container is to be pushed into the front end of the cylinder, the guard 34 at that end may be manually swung upwardly. As the container at the rear end of the cylinder emerges, it swings the other guard 35 upwardly against the resistance of its spring and passes under the guard. When the container completes its emergence, the guard 35 snaps back into its overhanging position.

*Operation of the device illustrated in Figs. I, II and III*

If the containers 31 be of such size that four of them will fill the cylinder 13, the temperature of the air surrounding the cylinder should be just high enough to properly preheat a container of material in the time that it takes to mold charges of material from four containers. The optimum temperature depends upon the type of molding composition being treated, the size of the charges, the character of the articles to be molded, and the speed of the molding press. With 2-pound charges of urea-formaldehyde molding composition and a molding cycle period of 2 minutes, the molding composition will be preheated for about 8 minutes. With this cycle, the temperature of the air surrounding the cylinder will be about 265° F. With the air at 265° F., 2-pound charges of urea-formaldehyde molding composition in granular form will be preheated in 8 minutes to a temperature of about 160° F. Phenol-formaldehyde molding compositions may be preheated to higher temperatures. To heat 2-pound charges of phenol-formaldehyde molding composition to 250° F. in 8 minutes, the temperature of the air surrounding the cylinder should be about 350° F.

The preheater described above operates most effectively if no more of the heating units are energized than are required to maintain the air surrounding the cylinder at the desired temperature. Therefore, for processing small charges of urea-formaldehyde molding composition to be molded on slowly operating presses, the pointer on the switch knob 24 should be turned to "Low" and the thermostat-operated switch knob 27 should be set with its pointer indicating the maximum temperature to which the air surrounding the cylinder is to be raised. If the pilot lamp 29 remains lighted continuously, the operator should turn the pointer on the knob 24 to "Med.," thus switching on four heaters instead of two. For processing large charges of material, the pointer on the switch knob 24 should be turned to "High." If during the processing the pilot lamp should be unlit for much of the time, the operator should turn the pointer on the knob 24 to "Med.," thus switching out two of the heating units and lessening the fluctuation in the supply of heat.

With the apparatus in preliminary adjustment and the cylinder filled with empty containers, the operator closes the line switch 30, thus starting the motor 18 and energizing the heating units. When the thermometer 26 indicates that the air inside the cover 7 has been sufficiently heated, the operator pushes a container charged with a weighed or measured quantity of molding composition into one end of the revolving cylinder, thus pushing one of the empty containers out of the other end. Then, at intervals corresponding to the molding cycle period, he inserts additional charged containers into the cylinder. When the charged container first inserted emerges from the preheater, its preheated contents are transferred promptly to the molding apparatus and the container is recharged and reinserted in the preheater at the proper interval, the succeeding emerging containers being handled in like manner. The preheater thus furnishes a can of preheated composition ready for each molding operation.

As the cylinder and cans rotate above the heating units, the fragmentary material, whether it be in powdered, granular, or tableted form, is so tumbled that it slides over the curved sides and flat ends and covers of the cans and brushes loose any particles that tend to adhere. No part of the tumbling contents of a can remains in juxtaposition to the hot walls, those parts momentarily in contact with the walls being in constant movement, which quickly carries them away from the walls and disperses them throughout the mass.

The charges of material should not more than half fill the containers. When very large moldings are to be made, longer and fewer containers may be employed. Although we have illustrated the containers of such length that four of them fill the revoluble cylinder 13, obviously cans of such length that one, two, three, five, six or more fill the cylinder may be used. When large moldings are to be made and large cans are not available, the charges may be divided and placed for preheating with each charge in two or more cans. In any case, the containers should fill the revolving cylinder and thereby close the end openings, and the preheating time should be so adjusted with reference to the molding cycle that each preheated charge may be transferred to the molding apparatus without delay after being delivered by the preheater.

When the containers are to be used for another type or another color of compound, they may be thoroughly cleaned by the use of an air hose.

*Description of embodiment illustrated by Figs. IV, V and VI*

Figs. IV, V and VI illustrate a modification of the invention employing construction somewhat more elaborate than that above described. The chief advantages of this modification are compactness and an arrangement whereby containers may be both inserted and removed from the front.

The base of this form of preheating device consists of a rectangular frame 101, of angle section, supported on legs 102, the front legs being slightly the longer. Mounted within the angle section frame 101 is a slab 103 of insulating board, and fixed to the frame 101 and extending perpendicularly upwardly therefrom is a rigid mechanism supporting plate 104. The plate 104 is provided with spaced openings within which are mounted ball bearing journals 105 supporting rotatable shafts 106 to the rear ends of which large sprocket wheels 107 are fixed, an endless chain 108 being looped about the large sprocket wheels 107 and passing over a smaller sprocket wheel 109.

Fixed upon the forward end of each of the shafts 106 is a spider 110, and carried by and extending forwardly from each of the spiders 110 is a perforated sheet metal cylinder 113. The sprocket 109 is driven through suitable reduction gearing, housed in a casing 114, by an electric motor 116, the reduction gearing casing and motor being supported by a shelf 117 welded to and extending rearwardly from the mechanism supporting plate 104. In this form of device, when the motor 116 is turning, the shafts 106 and cylinders 113 are turned at slow speed, e. g. 34 R. P. M. The cylinders 113 are enclosed within a sheet metal housing 115 lined with insulating board, there being also a layer of insulating board upon the front face of the mechanism supporting plate 104. The forward ends of the cylinders 113 are open and lie within openings in the front wall of the housing 115 with just sufficient clearance to permit free rotation of the cylinders.

Secured to the slab 103 and extending upwardly at the sides of the lower cylinders are sub-frames 118, upon which are mounted three pairs of strip insulating units 119, 120 and 121, one unit of each pair lying beneath the lower cylinders, while the other unit lies beneath the upper cylinders. The heating units are connected, in a manner identical to that diagrammed in Fig. VII and described above, to a switch operated by a knob 124, by selective turning of which one pair of units 119, two pairs of units 120 and 121, or all three pairs of units may be energized. The switch knob 124 is located on the switchboard 125, which, like the switchboard in the form of device previously described, may be marked with the indicia "Off," "Low," "Med.," "High." A thermometer 126 is located with its exterior dial on the front of the housing 115, and a thermostat-operated switch knob 127' is located on the exterior of the housing near the switchboard 125. The knob 127' may be turned to set a switch 127 operated by a thermostat 128 and connected in circuits like those diagrammed in Fig. VII. A pilot lamp 129 is connected in series with the thermostat-operated switch and is lighted whenever any of the heating units is energized, the entire electrical system employed in this modification being identical with that diagrammed in Fig. VII and described above.

Containers 131, with slip covers 132, like those hereinbefore described, are inserted in the cylinders 113, one covered container filling each cylinder and closing its open end. Owing to the longer length of the front legs 102, the forward ends of the cylinders 113 are tilted upwardly enough to prevent the containers from working out as the cylinders rotate.

In order to give access to the motor 116 and the driving mechanism, the rear wall of the housing 115 is hinged, as indicated by the numeral 133, and a latch 134 serves to hold the hinged rear wall in closed position. To provide ventilation, the portion of the housing 115 enclosing the motor and driving mechanism may be provided with louvers 135, and if desired the motor may be equipped with a small fan 136 to blow air from this compartment of the housing through an opening 137, thereby drawing cool air in through the louvers.

*Operation of the form of device illustrated in Figs. IV, V and VI*

The temperatures employed in the operation of the device illustrated in Figs. IV, V and VI are the same as those employed in the operation of the form of device illustrated in Figs. I, II and III, and the rate of rotation of the cylinders, the time during which the material is treated and the movement of the material in the containers also are the same as is the case in the operation of the form of device first described. In the form of device illustrated in Figs. IV, V and VI, however, there is a separate cylinder for each container. With empty containers in each of the cylinders and the air inside the housing at proper temperature, the operator replaces one of the empty containers with a container charged with molding composition, and at intervals corresponding to the molding cycle period he replaces each of the other three empty containers, in rotation, with charged containers. When the charged container first inserted has been preheated for a time corresponding to four times the molding cycle period, he removes it and replaces it with a container of unheated material, transfers the preheated material from the first container to the mold and recharges it with unpreheated material, ready to be inserted in the cylinder from which the succeeding container of preheated material is removed. The preheating of the composition is thus co-ordinated with the operation of the molding press.

Where large molded articles are to be made, the molding composition to be used in making each article may be divided and each part heated in a separate container, the separate containers being inserted simultaneously in and removed simultaneously from their cylinders.

In some cases it may be preferable to use only two or three of the cylinders of a preheater. In such cases the unused cylinder should nevertheless be occupied by a container. In cases where the capacity of the four cylinders is insufficient, two or more preheaters may be used in connection with a single molding press. Of course, preheaters embodying the invention may be constructed with any number of cylinders, and the cylinders may be of any desired size.

The embodiments of the invention herein shown and described are to be regarded as illustrative only, and it is to be understood that the invention is susceptible to variation, modification and change within the spirit and scope of the subjoined claims.

Having described our invention, we claim:

1. A process of preparing molding materials for molding which includes the steps of successively placing comminuted charges of such molding materials in a heated environment at intervals substantially corresponding to the period required for molding one of said charges, subjecting each of said charges to such heated environment at controlled temperatures for a time extending over a plurality of said intervals and meanwhile tumbling each of said comminuted charges to avoid overheating of any portion of any of said comminuted charges, thereby preheating said charges and making them available for molding at intervals substantially equal to the intervals at which, and in the same order in which, said charges were placed in such heated environment, and successively replacing said preheated charges with additional charges for preheating.

2. A process of preparing molding materials for molding which includes the steps of placing comminuted charges of such molding materials in imperforate containers, covering such containers and successively inserting them in a heated atmosphere at intervals corresponding to the period required for molding one of said charges, maintaining such containers in such heated atmosphere at controlled temperatures for times extending over a plurality of such periods and meantime rotating such containers and thereby tumbling said comminuted charges and moving them over the interior surfaces of such containers to prevent sticking of any of the particles of said charges to such interior surfaces, thereby preheating said charges and making them available for molding at intervals substantially equal to the intervals at which, and in the same order in which, such containers were placed in such heated atmosphere, and successively replacing the containers holding the charges that have been so made available for molding with imperforate containers containing additional charges for preheating.

3. In a device of the class described, in combination, a series of imperforate containers adapted to contain comminuted charges of molding materials, a single chamber having means for successively receiving individual containers while a plurality of said containers remains in said receiving means, means for rotating said receiving means and the containers received therein to tumble the comminuted contents of said containers and move its particles over the interior surfaces of said containers to prevent sticking, and means for heating the mobile particulate contents of said containers during such tumbling.

4. In a device of the class described, in combination, a series of imperforate containers adapted to contain comminuted charges of molding materials, means for receiving a plurality of said containers, means whereby additional containers may be substituted individually for containers in said receiving means, means for rotating said receiving means and the containers received therein to tumble the particulate contents of said containers, said containers being replaceable in regular order at intervals independent of the speed of rotation of said receiving means, whereby such intervals may be varied to conform to the time required for molding charges containing various quantities and materials of various kinds, a chamber surrounding said rotatable receiving means, heating means located within said chamber, a thermostat located within said chamber, and means controlled by said thermostat to regulate said heating means and thereby control the temperature within said chamber.

5. In a device of the class described, in combination, a chamber, heat insulating means to retard the passage of heat through the walls of said chamber, rotatably mounted elongated cylindrical container receiving means located within said chamber, a plurality of imperforate containers adapted to contain molding materials in finely divided form and to be received in said container receiving means and substantially fitting therein, means for rotating said container receiving means to tumble the contents of said containers, a plurality of electric heating units located within said chamber, manually operable means for selectively energizing parts or all of said electric heating units, a thermostat located within said chamber, means controlled by said thermostat for de-energizing and re-energizing said electric heating units to control temperatures within said chamber, and manually operable means for setting said thermostatically controlled means to maintain the temperatures within said chamber at various values.

6. In a preheater for molding materials, in combination, a chamber having circular openings in its walls, open-ended container receiving means located in said chamber, the open ends of said open-ended container receiving means extending into and substantially conforming to the openings in said walls, means for heating the interior of said chamber, means for rotating said open-ended container receiving means, and a series of imperforate covered containers adapted to contain molding material in finely divided form and for successive insertion in and subsequent successive removal from said open-ended container receiving means, said covered containers, when filling said container receiving means, closing the open ends thereof.

7. In a preheater for molding materials, in combination, a chamber having circular openings in its walls, open-ended cylindrical container receiving means located in said chamber, the open ends of said open-ended cylindrical container receiving means extending into and substantially conforming to the openings in said walls, means for heating the interior of said chamber, means for rotating said open-ended cylindrical container receiving means, a series of imperforate covered containers adapted to contain comminuted molding material and for successive insertion in and subsequent successive removal from said open-ended cylindrical container receiving means, said covered containers, when filling said cylindrical container receiving means, closing the open ends thereof, and thermostatically controlled means for regulating temperatures within said chamber.

8. In a preheater for molding materials, in combination, a chamber having openings in opposite walls, a perforated sheet metal cylinder open at both ends and lying within said chamber with its ends in close conformation to the openings in said walls, means for rotating said cylinder, and a series of imperforate covered containers for comminuted molding materials adapted to be successively inserted in one end of said cylinder and subsequently to be successively discharged from the other end thereof, the length of said cylinder being a multiple of the length of each of said containers, whereby a plurality of said containers will substantially fill said cylinder.

9. In a preheater for molding materials, in combination, a chamber having openings in opposite walls, a perforated sheet metal cylinder open at both ends and lying within said chamber with its ends in close conformation to the openings in said walls, means for rotating said cylinder, a series of imperforate covered containers for comminuted molding materials adapted to be successively inserted in one end of said cylinder and subsequently to be successively discharged from the other end thereof, the length of said cylinder being a multiple of the length of each of said containers, whereby a plurality of said containers will substantially fill said cylinder, a series of electric heating units located within said chamber, and thermostatic means within said chamber for controlling the energization of said electric heating units.

10. In a preheater for molding materials, in combination, a chamber having openings in opposite walls, a perforated sheet metal cylinder open at both ends and lying within said chamber with its ends in close conformation to the openings in said walls, means for rotating said cylinder, a series of imperforate covered containers for comminuted molding materials adapted to be successively inserted in one end of said cylinder and subsequently to be successively discharged from the other end thereof, the length of said cylinder being a multiple of the length of each of said containers, whereby a plurality of said containers will substantially fill said cylinder, a series of electric heating units located within said chamber, manually operable means for selectively energizing parts or all of the electric heating units of said series, and thermostatic means within said chamber for controlling the energization of said electric heating units and thereby regulating temperatures within said chamber.

11. In a device of the class described, in combination, an elongated chamber, heat insulating means for the walls of said chamber, there being circular openings through the end walls of said chamber and through the heat insulating means therefor, an open-ended elongated sheet metal cylinder lying within and extending throughout the length of said chamber, the ends of said cylinder lying within and substantially conforming to said circular openings, means rotatably supporting said cylinder, an electric motor, gearing for transmitting motion from said motor to rotate said cylinder, and a plurality of imperforate containers for comminuted molding materials adapted to be successively inserted in one end of said cylinder and progressively moved therethrough.

12. In a device of the class described, in combination, an elongated chamber, heat insulating material lining the walls of said chamber, there being circular openings through the end walls of said chamber and through the heat insulating material lining said end walls, an open-ended elongated perforated sheet metal cylinder lying within and extending throughout the length of said chamber, the open ends of said cylinder lying within and substantially conforming to said circular openings, means rotatably supporting said cylinder, an electric motor, gearing for transmitting motion from said motor to rotate said cylinder, a plurality of imperforate containers for comminuted molding materials adapted to be successively inserted in one end of said cylinder and pushed by progressive steps therethrough, a plurality of electric heating units located within said chamber, manually operable means for selectively energizing parts or all of said plurality of electric heating units, and thermostatically controlled means for de-energizing and re-energizing said electric heating units to regulate temperatures within said chamber.

13. In a device of the class described, in combination, a heat-insulated elongated chamber having openings in both ends thereof, a rotatable perforate cylinder within said chamber, said rotatable perforate cylinder being open at both ends and extending between the openings in the ends of said chamber, a plurality of closed imperforate containers each adapted to contain a quantity of comminuted molding material to be preheated, said plurality of closed imperforate containers being adapted to be inserted into said rotatable perforate cylinder, the length of each of said closed imperforate containers being an aliquot part of the length of said rotatable perforate cylinder, whereby when said rotatable perforate cylinder is filled with such containers the insertion of an additional one of such containers into said cylinder through the opening in one end of said chamber entirely expels one of said containers from the opening in the other end of said chamber.

CARLETON ELLIS, Jr.
CHARLES S. DEWEY, Jr.